(12) United States Patent
Choi et al.

(10) Patent No.: US 7,100,969 B2
(45) Date of Patent: Sep. 5, 2006

(54) WAKE DISTURBING APPARATUS AND METHOD FOR REDUCING DRAG

(75) Inventors: Haecheon Choi, Seoul (KR); Jin Choi, Busan (KR); Dongkon Lee, Seoul (KR); Jeonglae Kim, Seoul (KR); Woo-Pyung Jeon, Seoul (KR); Seonghyeon Hahn, Seoul (KR); Jinsung Kim, Seoul (KR)

(73) Assignee: Seoul National University, Seoul (KR)

( * ) Notice: Subject to any disclaimer, the term of this patent is extended or adjusted under 35 U.S.C. 154(b) by 105 days.

(21) Appl. No.: 10/883,804

(22) Filed: Jul. 6, 2004

(65) Prior Publication Data
US 2005/0012358 A1    Jan. 20, 2005

(30) Foreign Application Priority Data
Jul. 15, 2003    (KR) .................... 10-2003-0048436

(51) Int. Cl.
*B60R 27/00*    (2006.01)
(52) U.S. Cl. .................... 296/180.1; 180/903
(58) Field of Classification Search ............ 296/180.1, 296/180.2, 180.3, 180.4, 180.5; 180/903
See application file for complete search history.

(56) References Cited
U.S. PATENT DOCUMENTS

| | | | | |
|---|---|---|---|---|
| 1,871,396 A | * | 8/1932 | Stalker ............ | 296/180.1 |
| 2,800,291 A | * | 7/1957 | Stephens .......... | 244/200 |
| 4,103,957 A | * | 8/1978 | Landry et al. ..... | 296/180.4 |
| 4,343,506 A | * | 8/1982 | Saltzman .......... | 296/180.2 |
| 5,058,837 A | * | 10/1991 | Wheeler ........... | 244/200.1 |
| 6,276,636 B1 | | 8/2001 | Krastel | |
| 6,634,700 B1 | * | 10/2003 | Calvert ............ | 296/180.4 |
| 2002/0030384 A1 | * | 3/2002 | Basford ........... | 296/180.1 |

FOREIGN PATENT DOCUMENTS

JP    62-094477    4/1987

* cited by examiner

*Primary Examiner*—Lori L. Coletta
(74) *Attorney, Agent, or Firm*—Rothwell, Figg, Ernst & Manbeck

(57) ABSTRACT

Provided is a wake disturbing apparatus and method for reducing drag, which can considerably reduce drag caused by a sharp decrease in the pressure behind an object with a blunt trailing edge, such as a vehicle, while the object is traveling at high speed. The wake disturbing apparatus includes a plurality of disrupters, which are arranged at regular intervals along the trailing edge of the object to protrude to a predetermined height so that the vortical strength of the wake occurring around the rear part of the object can be reduced and the pressure at the base surface, which has been decreased due to the wake, can be recovered. Accordingly, it is possible to considerably reduce drag on a vehicle by simply attaching a wake disturbing apparatus to the vehicle without modifying the structure of the vehicle or using additional energy. Thus, it is possible to reduce power consumption of the vehicle and thus maximize the energy consumption efficiency.

4 Claims, 4 Drawing Sheets

WAKE DISTURBING APPARATUS AND METHOD FOR REDUCING DRAG

BACKGROUND OF THE INVENTION

This application claims the priority of Korean Patent Application No. 2003-48436, filed on Jul. 15, 2003, in the Korean Intellectual Property Office, the disclosure of which is incorporated herein in its entirety by reference.

1. Field of the Invention

The present invention relates to a wake disturbing apparatus and method for reducing drag, which can considerably reduce drag caused by a significant decrease in the pressure behind an object with a blunt trailing edge, such as a vehicle, while the object is traveling at high speed.

2. Description of the Related Art

In general, large vehicles, such as a heavy vehicle and a bus consume about 60% of their energy through aerodynamic drag. For example, in a case where a heavy vehicle travels 100 kilometers an hour, air resistance is accountable for 60% of its total energy consumption.

Such aerodynamic drag often occurs due to pressure at a rear part of an object (hereinafter, this part is referred to as 'base surface') while the object is traveling at high speed. The drag on the object can be reduced by decreasing the strength of vortical motion around the base surface and thus recovering pressure there, which has been decreased due to the strong vortical motion of the wake.

There have been many attempts to increase pressure at the base surface, but most of them cannot be realized and commercialized because they require the shape of the object to be significantly changed into, for example, a streamlined one, or they need much more energy than they can save by reducing the aerodynamic drag.

SUMMARY OF THE INVENTION

The present invention provides a wake disturbing apparatus and method for reducing drag, which can decrease energy consumption of a vehicle by attenuating vortical motion occurring around a rear part of the vehicle with a blunt trailing edge.

The present invention also provides a wake disturbing apparatus and method for reducing drag, which can considerably decrease vortical motion of the wake by simply attaching a predetermined device (hereinafter, this device is referred to as 'wake disrupter') to a part of the trailing edge of a vehicle without additional energy input and thus can maximize energy consumption efficiency.

According to an aspect of the present invention, a wake disrupter is provided which reduces drag on an object with a blunt trailing edge (e.g., a truck). The wake disturbing apparatus includes a plurality of disrupters, which are arranged at regular intervals along the trailing edge of the object to protrude to a predetermined height so that the vortical strength of wake occurring around the rear part of the object can be reduced and thus the pressure, which has been decreased due to the wake, can be recovered.

The wide surfaces of the disrupters are perpendicular to the airflow so that they can meet with the most air resistance. The height of the disrupters is approximately equal to the thickness of a boundary layer flow, and the width of the disrupters ranges from 0.02 h to 0.3 h, where h is the height of an object.

The disrupters may include a pair of narrowing wing plates having a distance therebetween which gradually narrows toward the trailing edge of the object so that airflow therebetween can be converged and accelerated; and a pair of widening wing plates having a distance therebetween which gradually widens toward the trailing edge of the object so that airflow therebetween can be expanded and decelerated. The pairs of narrowing and widening wing plates may be arranged adjacent to each other and share a common wing plate.

According to another aspect of the present invention, a wake disturbing method of reducing drag on an object with a blunt trailing edge (e.g., a truck) is provided. The wake disturbing method involves arranging a plurality of disrupters at regular intervals along a trailing edge of a surface of the rear part of the object to protrude to a predetermined height so that the vortical strength of wake occurring around the rear part of the object can be reduced and thus the pressure, which has been decreased due to the wake, can be recovered.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which preferred embodiments of the invention are shown.

Figure 1:
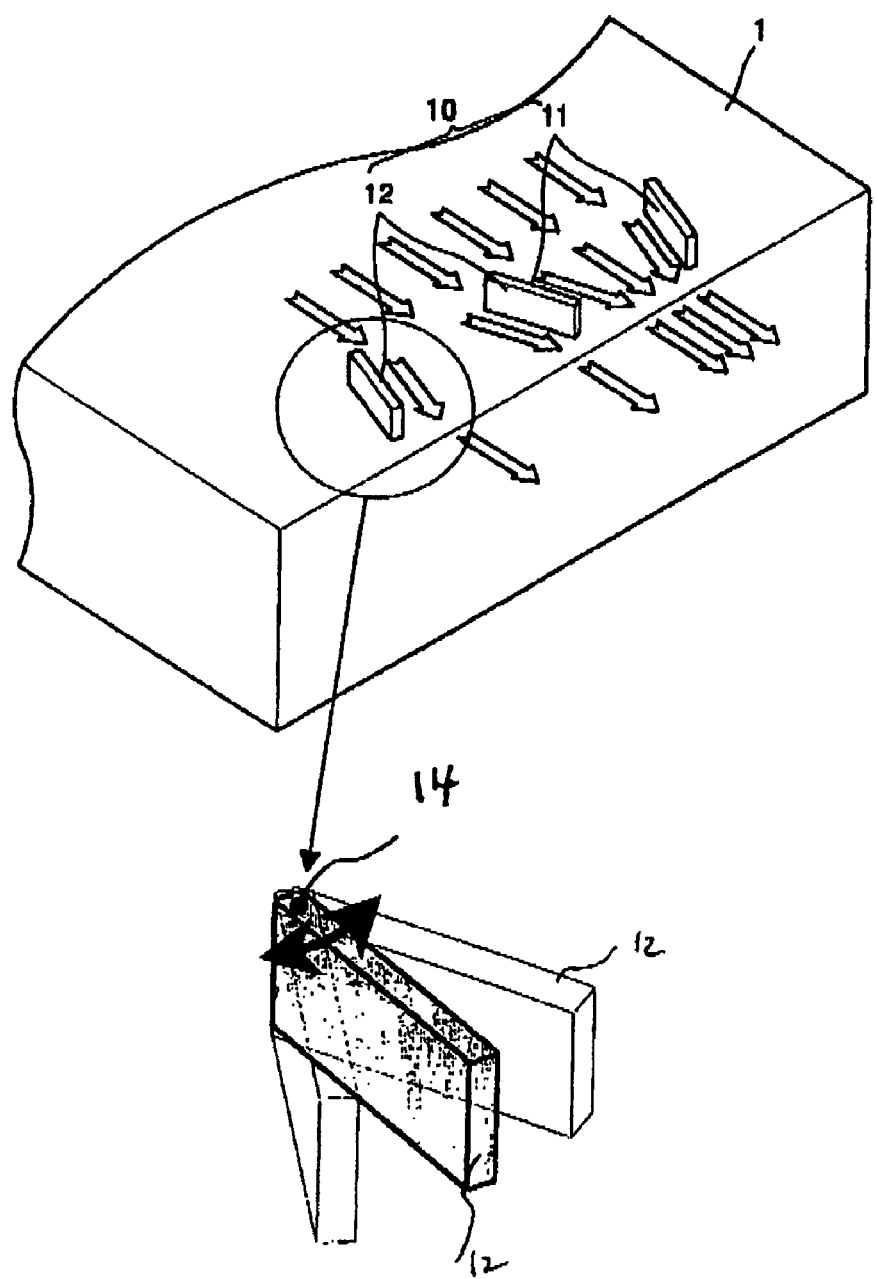
FIG. 1 is a perspective view of a wake disturbing apparatus for reducing drag, according to a preferred embodiment of the present invention.

FIG. 1 is a perspective view of a wake disturbing apparatus for reducing drag, according to a preferred embodiment of the present invention. Referring to FIG. 1, the wake disturbing apparatus reduces drag on an object 1, such as a truck having a blunt trailing edge. The wake disturbing apparatus includes a plurality of disrupters 10, which are arranged at regular intervals along the trailing edge of the object 1 and protrude to a predetermined height. Therefore, the vortical strength of wake occurring behind the object 1 can be reduced, and the pressure at the base surface of the object 1, which has been decreased due to the wake, can be recovered.

The disrupters 10 may assume different forms. However, in the present embodiment, the disrupters 10 are classified into narrowing wing plates 11 and widening wing plates 12, as shown in FIG. 1.

The narrowing wing plates 11 are arranged just upstream of the trailing edge of the object 1 with a distance therebetween gradually narrowing toward the edge so that the flow of air passing therebetween is converged and accelerated. On the other hand, the widening wing plates 12 are arranged just upstream of the trailing edge of the object 1 with a distance therebetween gradually widening toward the edge so that the flow of air passing therebetween is expanded and decelerated.

The disrupters 10 are arranged at regular intervals just upstream of the trailing edge of the object 1 in a zigzag fashion so that every two adjacent disrupters 10 can form either narrowing wing plates 11 or widening wing plates 12.

Therefore, as shown in FIG. 1, airflow between the narrowing wing plates 11 is accelerated because the distance between the narrowing wing plates 11 gradually narrows toward the edge. On the other hand, airflow between the widening wing plates 12 is decelerated because the distance between the widening wing plates 12 gradually widens toward the edge.

Accordingly, a difference between the speed of airflow between the narrowing wing plates 11 and the speed of airflow between the widening wing plates 12 breaks the two-dimensional Karman vortex of the wake occurring behind the rear part of the object 1. As a result, the pressure at the base surface of the object 1 increases, so drag on the object decreases.

In the wake disturbing apparatus, an actuator 14 or another angle adjustment means, which can optimally adjust an angle formed by every two adjacent disrupters 10 according to the airflow or the speed of the object 1, may be installed at, for example, each of the disrupters 10.

Here, the actuator or angle adjustment means, such as a wing angle adjusting apparatus for an airplane, which can adjust and maintain the angle of a wing by fixing a rotation axis of the wing tight into an elastic tube, such as a rubber tube, is well known to those skilled in the art, and thus its detailed description will not be presented here.

Figure 2:
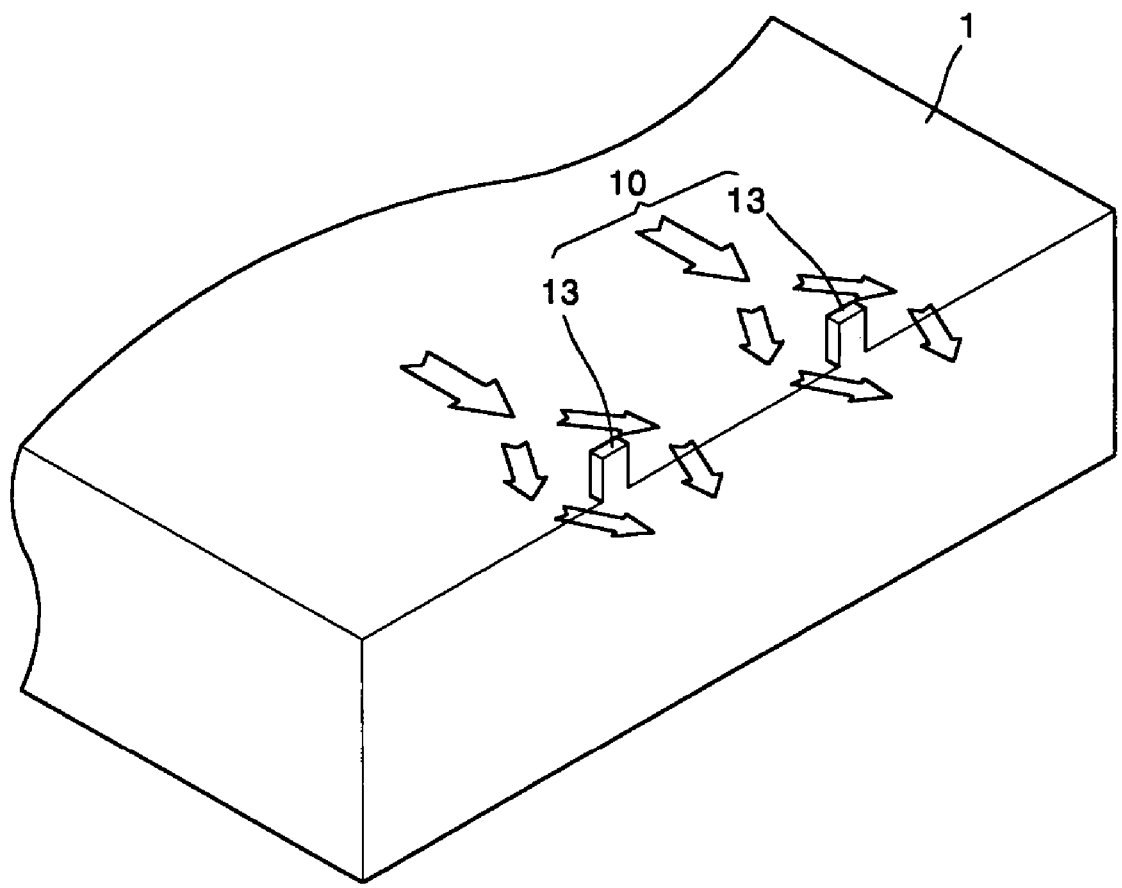
FIG. 2 is a perspective view of a wake disturbing apparatus for reducing drag, according to another preferred embodiment of the present invention.

FIG. 2 is a perspective view of a wake disturbing apparatus for reducing drag, according to another preferred embodiment of the present invention. Referring to FIG. 2, the wake disturbing apparatus includes disrupters 10, which stand upright on (or just upstream of) the trailing edge of a rear part of an object 1 so that their largest surfaces meet with the most air resistance. The height of the disrupters 10 is approximately equal to the thickness of an airflow boundary layer, and the width of the disrupters 10 ranges from about 0.02 h to about 0.3 h, where h is the height of the object 1.

As marked by arrows in FIG. 2, a small airflow causes air circulation, which disturbs turbulence over the rear part of the object 1. The disturbance of the turbulence results in an attenuated two-dimensional Karman vortex shedding. Accordingly the pressure at the base surface of the object 1 increases, thereby decreasing drag on the object.

Figure 3:
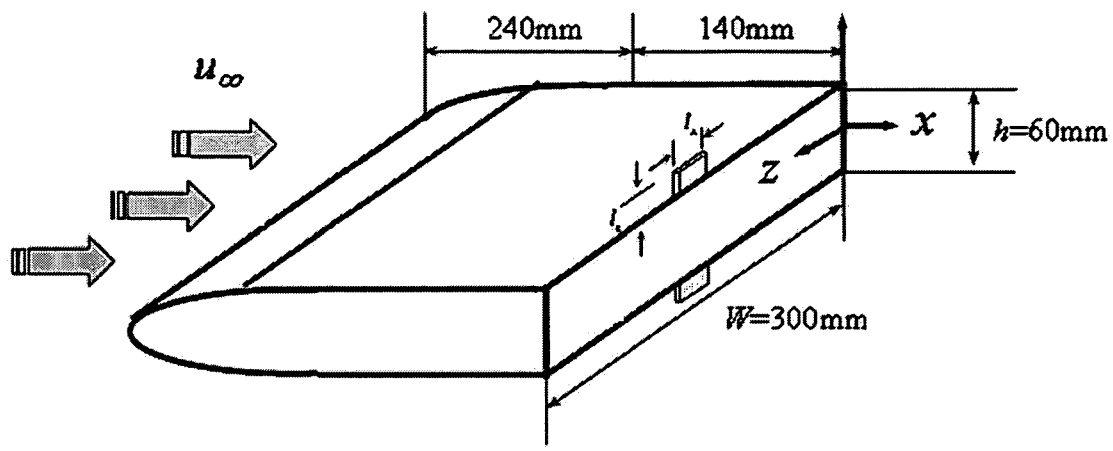
FIGS. 3 and 4 are a schematic and a photograph of the wake disturbing apparatus, respectively, of FIG. 2.
Figure 4:
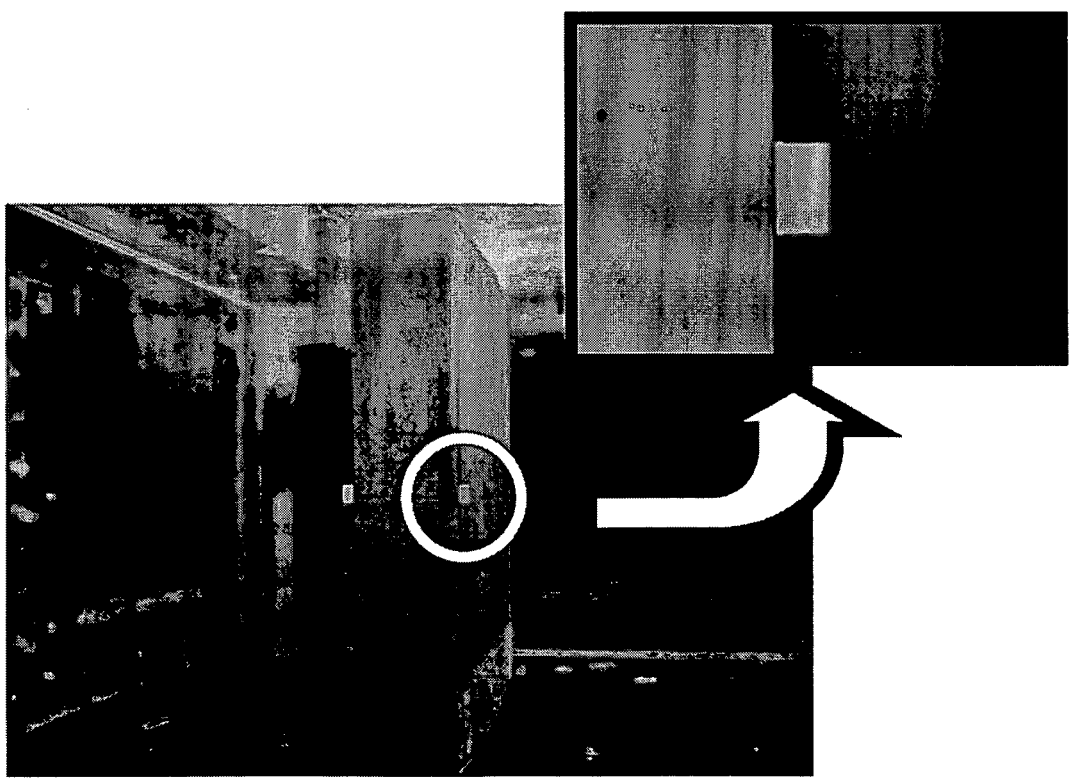
Figure 5:
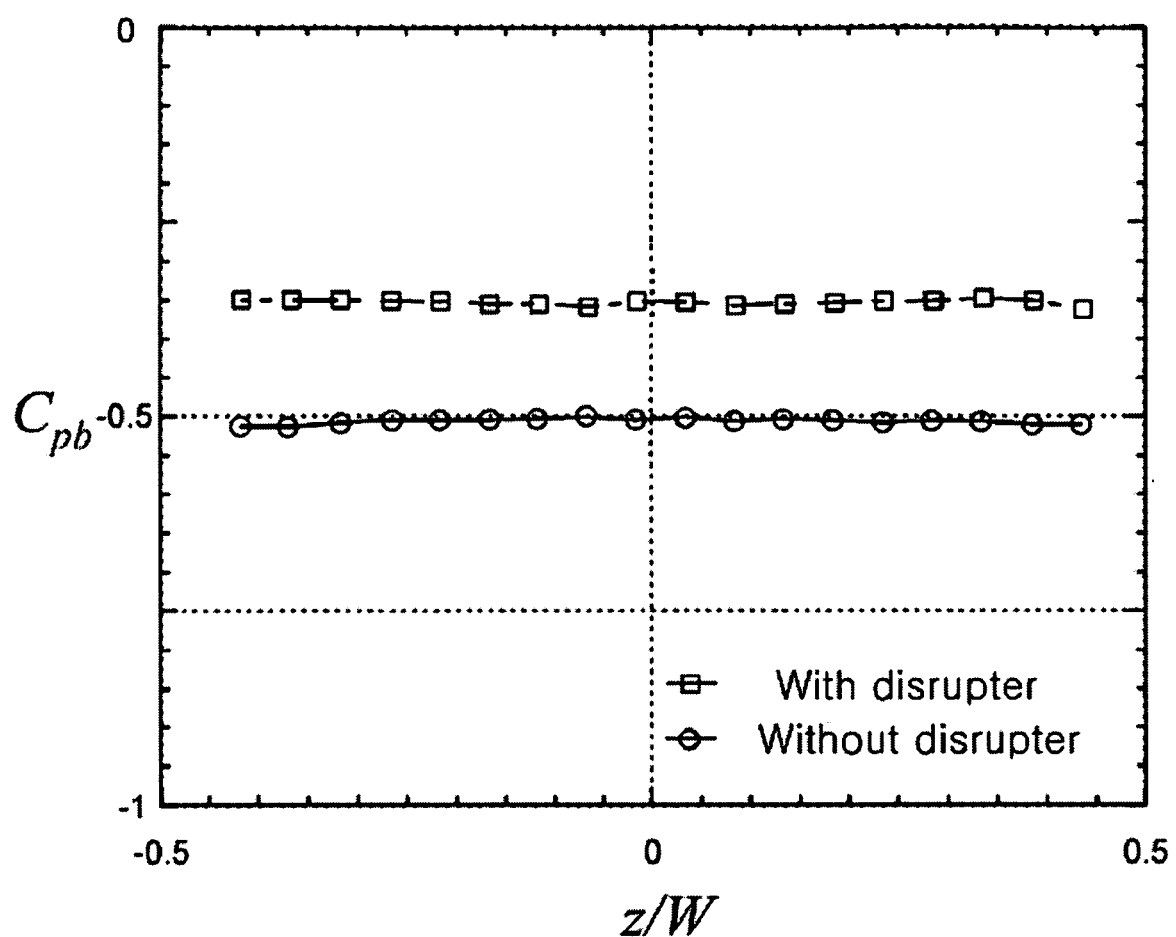
FIG. 5 is a diagram illustrating experimental results that show the recovery of pressure at the base surface at the Reynolds number of 20000 for the cases without and with wake disrupter.

Wind tunnel experiments on the wake disturbing apparatus of FIG. 2 were carried out at the wind speeds of 5, 10, and 20 m/s. The vehicle model used in the experiments had a height of 6 cm and a width of 30 cm, and its nose was shaped into a half ellipse with its ratio of the major to minor axis of 8. Wind tunnel test sections had a size of 60 cm×30 cm with a 10% blockage effect. The results showed an increase in pressure of up to 30%, when only one square disrupter having a height of 1.25 cm was mounted on the midspan of the trailing edge of a vehicle model (see FIGS. 3 and 4) having a Reynolds number of 20,000, as compared to the case when no disrupters were mounted on the vehicle model (see also FIG. 5). Such an increase can be translated into a 20% decrease in drag.

It is possible to disturb the wake around the rear part of a vehicle, recover the pressure at the base surface due to the reduced wake, and thus considerably reduce drag by simply attaching or fixing the disrupters 10 of FIGS. 1 and 2 onto the trailing edge of a vehicle at regular intervals without modifying the structure of the vehicle or using additional energy.

In short, in the present invention, the disrupters 10 are arranged at regular intervals along the trailing edge of the vehicle so that the disrupters 10 protrude from the surface. The distance between two adjacent disrupters 10 can be optimised according to the height of the vehicle, and the shape and size of the disrupters 10 are determined so that acceleration and deceleration of airflow can alternately occur over the surface of the rear part of the vehicle.

As described above, according to the present invention, it is possible to considerably reduce drag on a vehicle by simply attaching wake disrupters to the vehicle without modifying the structure of the vehicle or using additional energy. Thus, it is possible to reduce power consumption of the vehicle and thus maximize the energy consumption efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, protrusions other than those set forth herein can be used as disrupters as long as they are arranged at regular intervals so that the wake around the rear part of a vehicle can be disturbed.

What is claimed is:

1. A wake disturbing apparatus reducing drag (i.e., air resistance) on an object with blunt trailing edge (e.g., a truck), the wake disturbing apparatus comprising:
   a plurality of disrupters, which are arranged at regular intervals along a trailing edge of the object and protrude to a predetermined height so that the vortical strength of wake occurring behind the object can be reduced and the pressure at the base surface, which has been decreased due to the wake, can be recovered;
   wherein the disrupters comprise: a pair of narrowing wing plates having a distance therebetween which gradually narrows toward the trailing edge of the object so that airflow therebetween can be converged and accelerated; and a pair of widening wing plates having a distance therebetween which gradually widens toward the trailing edge of the object so that airflow therebetween can be expanded and decelerated, and the pair of narrowing wing plates and the pair of widening wing plates are arranged adjacent to each other and share a common wing plate; and
   an angle adjustment means, which is installed at each of the disrupters and optimizes an angle formed by each pair of disrupters by adjusting the angle in consideration of airflow (or the speed of the object).

2. The wake disturbing apparatus of claim 1, wherein the largest surfaces of the disrupters are perpendicular to the airflow so that they can meet with the most air resistance, the height of the disrupters is approximately equal to the thickness of an airflow boundary layer, and the width of the disrupters ranges from 0.02 h to 0.3 h.

3. The wake disturbing apparatus of claim 1, wherein the disrupters are arranged at regular intervals so that each pair of disrupters can serve as either the pair of narrowing wing plates or the pair of widening wing plates.

4. The wake disturbing apparatus of claim 1, wherein a distance between adjacent disrupters is 3–6 times larger than the height of the object.

* * * * *